US006180192B1

United States Patent
Smith et al.

(10) Patent No.: US 6,180,192 B1
(45) Date of Patent: *Jan. 30, 2001

(54) SOLIDS PRODUCED FROM ASH AND PROCESS FOR PRODUCING THE SAME

(75) Inventors: Greg M. Smith, St. Louis, MO (US); Vahid Sendijarevic, Troy, MI (US); Daniel Klempner, Bloomfield, MI (US); Kurt C. Frisch, Grosse Ile, MI (US)

(73) Assignee: Wood Waste Energy, Inc., St. Louis, MO (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/823,222

(22) Filed: Mar. 24, 1997

(51) Int. Cl.$^7$ .......................... C04B 18/10; C04B 18/26; C04B 26/16

(52) U.S. Cl. .............................. 428/2; 264/109; 264/122; 428/423.1

(58) Field of Search .................... 264/109, 122, 264/112, 37.3, 911; 428/2, 423.1

(56) References Cited

U.S. PATENT DOCUMENTS

| | | | |
|---|---|---|---|
| 3,962,080 | 6/1976 | Dulin et al. ............... | 210/59 |
| 3,965,051 | * 6/1976 | Markusch et al. . | |
| 4,210,457 | 7/1980 | Dodson et al. .......... | 106/97 |
| 4,367,259 | * 1/1983 | Fulmer et al. . | |
| 4,374,743 | 2/1983 | Stockel ................... | 252/70 |
| 4,380,474 | * 4/1983 | Cioca et al. . | |
| 4,469,503 | 9/1984 | Stockel ................... | 71/24 |
| 4,624,711 | 11/1986 | Styron .................... | 106/308 |
| 4,725,632 | 2/1988 | Vess ....................... | 523/220 |
| 5,358,760 | 10/1994 | Furlong et al. ........... | 428/70 |
| 5,391,437 | 2/1995 | Miyasaka et al. ......... | 428/425.5 |
| 5,425,807 | 6/1995 | Riddle .................... | 106/707 |
| 5,807,513 | 9/1998 | Gebreselassie et al. ..... | 264/37.3 |

OTHER PUBLICATIONS

"Hazardous Waste Stabilization with Isocyanate–Based Binders", V–Sendijarevic et al, UTECH Asia '95, May 23–25, 1995.*

"Solidification/Stabilization of Hazardous Wastes By Means of Polymeric Isocyanate–Based Binder Systems", V. Sendijarevic et al, Polyurethanes World Congress 1993, Oct. 10–13, 1993.*

Sendijarevic et al., Recycling of Automotive Shredder Residue (ASR), 1995 Polymer Institute / SPE Symposium, pp. 1–13.

Sendijarevic et al., Recycling of Automotive Shredder Residue—Recent Developments in Shredder Downstream Separation Processes, SPE Recycling Division's 3rd Annual Recycling Conference Proceedings, Nov. 7–8, 1996, pp. 15–25.

Sendijarevic et al., Recycle of Automotive Shredder Residue, Proceedings of the Third Annual Automotive & Transportation Interiors Conference, May 7–9, 1996, pp. 70–80.

(List continued on next page.)

Primary Examiner—Mathieu D. Vargot
(74) Attorney, Agent, or Firm—Senniger, Powers, Leavitt & Roedel

(57) ABSTRACT

A compressed solid produced from a feed mixture of bottom ash and a binder. The feed mixture includes about 80% to 95% by weight bottom ash, or at least about 50% by weight bottom ash in combination with other waste materials, in combination with a polyisocyanate-based binder.

18 Claims, 3 Drawing Sheets

OTHER PUBLICATIONS

Sendijarevic et al., Utilization of Automotive Shredder Residue in Composite Applications, Advanced Composites Conference and Exposition, Nov. 6–9, 1995, pp. 617–627.

Gebreselassie et al., Utilization of Isocyanate–based Binders in Recycling of Automotive Composite Headliners, International Congress and Exposition, Feb. 23–26,1998, pp. 1–9.

Gebreselassie et al., Utilization of Scrap Automotive Headliners for Interior Trim Applications, Automotive & Transportation Interiors Expo Conference 1998, pp. 1–4.

Frisch et al., Utilization of Polymeric Isocyanate based Binders in Recycling of Automotive Shredder Fluff, Cellular Polymers III, 3rd International Conference, Apr. 27–28, 1995, pp. 1–8.

Hoechst Celanese Material Safety Data Sheet, Feb. 23, 1995, pp. 1–9.

Dow Material Safety Data Sheet, Feb. 7, 1996, pp. 1–11.

\* cited by examiner

SOLIDS PRODUCED FROM ASH AND PROCESS FOR PRODUCING THE SAME

BACKGROUND OF THE INVENTION

This invention relates to solids for use as bricks, building blocks, landscaping blocks, walkway stones, railroad ties, building blocks, steps, retaining wall blocks and other structural components. In particular, this invention provides for the use of a substantial proportion of bottom ash combined with a polymeric binder and optionally other components including fly ash in a feed mixture material to be pressed and dried to form solids, including building blocks, landscaping blocks and the like.

Wood-burning power plants produce large quantities of bottom ash and fly ash. Bottom ash presents disposal and handling difficulties because it is relatively heavy, wet, and is inconsistent in terms of texture and components. The major components of bottom ash include ash, wood, unburned carbons and sand. Heretofore this material has been primarily landfilled, although some attempts have been made to use it.

SUMMARY OF THE INVENTION

It is an object of this invention to provide a process for economically and environmentally recovering bottom ash produced by power plants, and especially wood-burning power plants. It is another object of this invention to produce solids including building blocks, landscaping blocks and the like from bottom ash generated by burning of scrap wooden railroad ties. It is an another object to provide railroad ties which have the strength of concrete ties, the density of wooden ties, and a high bottom ash content.

Briefly, therefore, the invention is directed to a compressed solid produced from a feed mixture comprising bottom ash and a binder, the feed mixture comprising at least about 50% by weight bottom ash.

The invention is also directed to a compressed solid for use as a building block, landscaping block or walkway stone produced by pressing and drying a feed mixture comprising about 80–95% by weight wood burning bottom ash and about 5–20% binder. The block has a compressive strength in the range of about 1000–10,000 psi and a flexural strength of at least about 500 psi. The bottom ash contains about 5–20% water, and the binder is selected from the group consisting of an isocyanatebased binder and an isocyanate-based binder in mixture with a polyol.

The invention is further directed to a compressed solid for use as a building block, landscaping block or walkway stone produced by pressing and drying a feed mixture comprising at least about 50% by weight first filler material consisting of wood burning bottom ash, 5–45% by weight second filler material, and about 5–20% binder. The block has a compressive strength in the range of about 1000–10,000 psi and a flexural strength of at least about 500 psi, the bottom ash contains about 5–20% water, and the binder is selected from the group consisting of an isocyanate-based binder and an isocyanate-based binder in mixture with a polyol.

Still further, the invention is directed to a process for producing a compressed solid from filler material comprising bottom ash., A filler material comprising at least about 50% bottom ash is mixed with a binder to form a feed mixture material of bottom ash and binder in intimate admixture. The feed mixture material is pressed into a solid shape suitable for use as a building block, landscaping block, or walkway stone.

Other objects and features of the invention will be in part apparent and in part pointed out hereinafter.

DETAILED DESCRIPTION OF THE INVENTION

Figure 1:
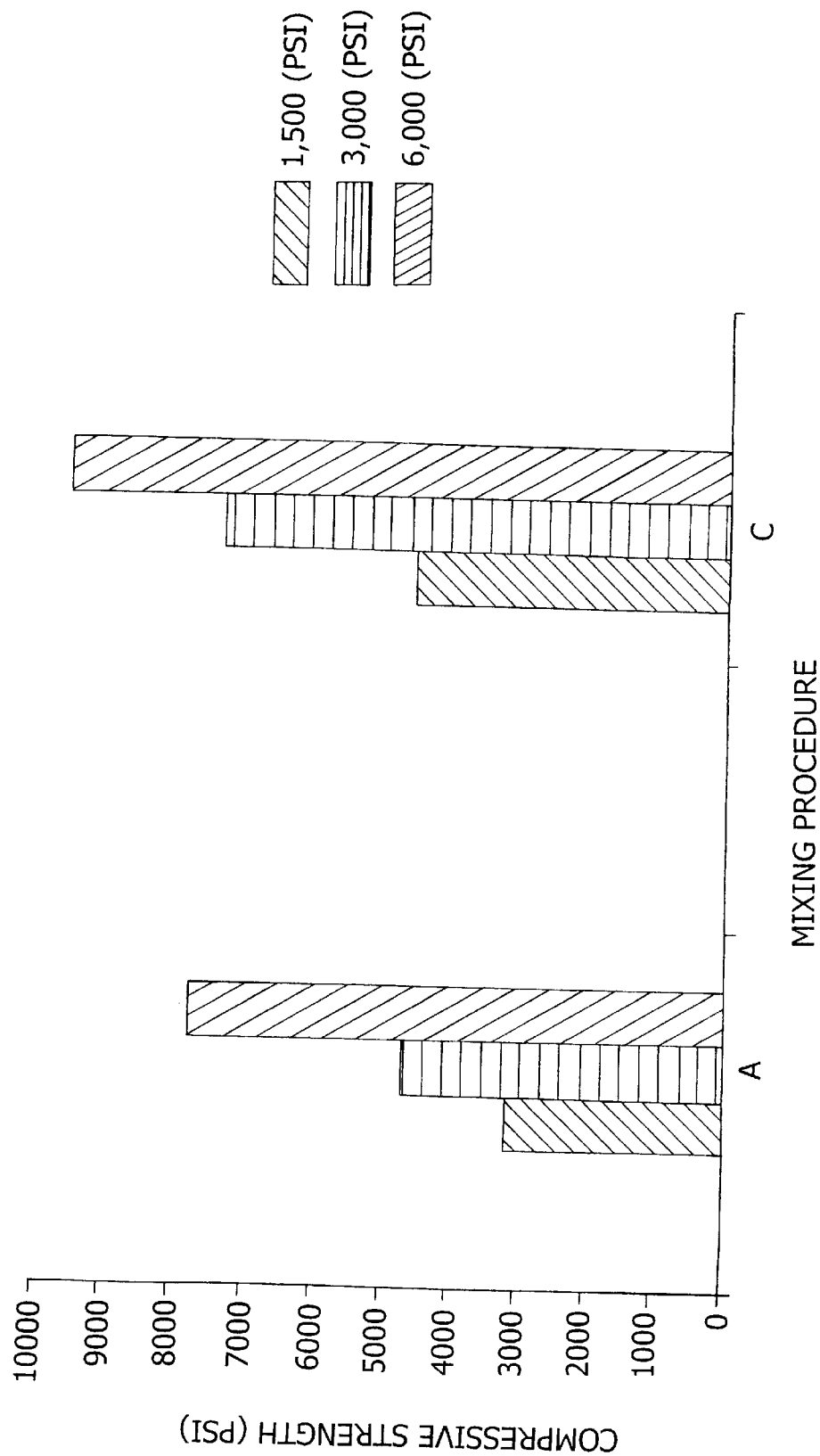
FIGS. 1–3 show the effect that mixing and molding pressure; concentration (load) of the bottom ash; and molding pressure have on the compressive strength of the product, respectively.

The preferred embodiment of the solid product of the invention comprises as its major constituent bottom ash produced from power plants, especially from power plants which burn wood fuel, including scrap wood railroad ties, utility poles and the like. It is desirable to use bottom ash which has a dry density of greater than about 60 lbs/ft$^3$. One preferred power plant bottom ash has a dry density about 68 lbs/ft$^3$. The product of the invention contains about 80–95% filler material comprising bottom ash combined with other optional components and the remainder binder. All percentage proportions described in this application are "by weight" unless indicated otherwise. One preferred embodiment employs at least about 80% by weight bottom ash, more preferably in the range of about 85–95% by weight bottom ash. This range has been discovered to most efficiently dispose of as much bottom ash as feasible while obtaining the desired physical properties in the solid product. Using substantially less than 80% bottom ash is generally less preferred because one of the objects of this invention is to dispose of as much bottom ash as possible. Using more than about 95% bottom ash has been discovered to detract from the compressive strength of the finished product. Using more than about 20% binder detracts from the cost-effectiveness of the product, due to the expense of the binder.

Bottom ash from the burning of waste wood products is a preferable filler material for use in the practice of the present invention because this ash presents such great disposal and handling problems. The most preferable of such material is bottom ash from burning waste railroad ties, utility poles and the like. Bottom ash is also preferred over other ashes such as coal ash or fly ash due to the superior properties it provides in the solid product, and because it presents greater disposal problems.

An alternative preferred embodiment employs about 80–95% filler material comprised primarily of bottom ash and also a substantial portion of other filler material, such as fly ash, shredded carpet fibers, broken glass, shredded mylar (e.g., from broken auto glass), cotton and the like. This embodiment, in particular, comprises at least about 50% bottom ash, 5–20% binder, and the remainder other filler waste material. One preferred version of this embodiment employs 50–75% bottom ash, 5–20% binder, and 5–45% other waste material selected from fly ash, shredded carpet fibers, shredded mylar, cotton and the like.

The preferred binder for binding together bottom ash to form the solids of the invention is a polymeric isocyanate-based binder. An example of a suitable polymeric isocyanate binder it that polymeric isocyanate-based binder distributed by Dow Chemical under the trademark PAPI 27. The material safety data sheet for PAPI 27, the entire disclosure of which is incorporated by reference, describes PAPI 27 as polymethylene polyphenyl isocyanate containing 4,4'methylene bisphenyl isocyanate. Another preferred binder consists of a composite mixture of a polymeric isocyanate, PAPI 27 in particular, in combination with a polyol, such as the terephthalate-based polyester polyol distributed by Hoechst Celanese under the trademark Terate 203. The material safety data sheet for Terate 203, the entire disclosure of which is incorporated by reference, describes Terate 203 as containing 20–22% diethylene glycol and the remainder dimethyl ester, manufactured of by-products from polymers with diethylene glycol 1,4-benzenedicarboxylic acid. Terate 203 is a recycled product made from scrap polyethyleneterephthalate (PET), the material of which many beverage containers and the like are typically made. The composite binder is preferably a mixture of PAPI 27 and Terate 203 in PAPI 27/Terate 203 equivalent weight ratios in the range of about 4:1 to about 11:1, more preferably of about 5:1 to about 10:1, still more preferably of about 5:1.

The binder used in this invention is catalyzed by moisture in the bottom ash during drying of the pressed feed mixture. The bottom ash therefore contains up to about 20%, preferably up to about 15% water, more preferably from about 5% to about 15% water, still more preferably from about 5% to about 10% water.

In accordance with this invention solids including building blocks, landscaping blocks, walkway stones and the like are formed by mixing bottom ash (or bottom ash in combination with other filler material) with the binder to form a feed mixture, applying a compressive stress to the feed mixture in a mold of the desired shape and dimensions, curing and drying of the molded shape, and aging of the molded shape. It is important that the feed mixture have binder and ash in intimate admixture to produce a consistent solid product being a matrix of filler material and binder having suitable mechanical strength. As used herein "solid" refers to a consolidated agglomeration formed by applying a compressive stress to the feed mixture either by compacting in a mold of a suitable compaction apparatus (e.g., overhead press, roller press, rotary tabletting press, briquetter or the like) or by extruding the feed mixture. Compression molding is preferably accomplished in an overhead press at a pressure of from about 1000 about 6000 psi, more preferably of from about 1500 to about 3000 psi. Curing is accomplished by heating the molded feed mixture to a temperature in the range of from about 250° F. to about 350° F., preferably about 300° F., for about 15 minutes. Maximum strength in the solid is then attained by an aging period of about 28 days at ambient conditions. Curing may be accomplished prior to removal of the product from the mold, but production requirements often dictate removal from the mold prior to curing. Optional post-curing (after curing and prior to setting) is accomplished by heating to a temperature in the range of about 250–350° F., preferably about 300° F., for about 15 minutes.

One molding method for use in this invention employs an overhead press having a ram which compresses the feed mixture into a mold cavity. The preferred mold cavity includes a bottom plate which is movable upwardly through the mold cavity to facility ejection of the molded shape above the side walls of the mold cavity so that it can be removed from the mold cavity. Preferably, the side walls of the cavity have a 1° draft angle to facilitate ejection of the molded solid.

Circular landscaping or walkway stones and rectangular landscaping blocks are among the preferred molded shapes of this invention. The brownish color and charcoal color of bottom ash provides a pleasing natural color, but pigments may also be used to impart other colors.

Further illustration of the invention is provided by the following examples:

EXAMPLE 1

Five ash samples, Bottom Ash 1, Bottom Ash 2, Fly Ash 1, Fly Ash 2, and Coal Ash, were separated on a Tyler 8 mesh (0.0937 inch) screen into two fractions. The fractions having a particle size of $\leq 0.0937$ inch were used in the preparation of solids. The ash samples were dried at 100° C. and determined to have dry densities as follows, in $lb/ft^3$: Bottom Ash 1–68, Bottom Ash 2–69, Fly Ash 1–31, Fly Ash 2–43, Coal Ash –41.

The volatility (moisture content) of the ash samples was measured according to ASTM B-2216-80 and determined to be as follows, in % weight loss at 100° C.: Bottom Ash 1–10, Bottom Ash 2–13, Fly Ash 1–10, Fly Ash 2–15, Coal Ash –30.

Five gram samples of Bottom Ash 1, Fly Ash 1, and Coal Ash were each mixed with 96.7 ml of distilled water at room temperature and the pH was determined to be as follows: Bottom Ash 1–12.03, Fly Ash 1–11.92, Coal Ash –5.65.

EXAMPLE 2

Bottom Ash 1 was mixed with a polyisocyanate-based binder, placed in a pre-heated (100° C.) mold cavity of a laboratory platen press having a maximum pressure of 36,000 psi, and test blocks (2 in. by 2 in. by 2 in.) were pressed and cured under a variety of conditions. The molding pressure for each block in Table 1 was approximately 1500 psi. The molding pressure for each block in Table 2 was varied between 3000 and 6000 psi. These pressures were maintained during curing, but it has been discovered that this is not necessary, in that the material does not have a tendency to rebound and therefore maintains its shape during curing without maintaining pressure thereon. Mold release agents such as Chemlease 55 and Chemlease 77 available from Chemlease, Inc. were employed. Curing and post-curing were carried out primarily in a thermal oven. After aging for seven days at room temperature, the blocks were tested for compressive strength properties according to ASTM D1621 and for flexural strength according to ASTM D790-84. The results of these tests are presented in Tables 1 and 2 and FIGS. 1 and 2. The binder used was a mixture of PAPI 27 and Terate 203; the isocyanate index presented in Table 1 is defined as the isocyanate to polyol equivalent ratio multiplied by one hundred: (NCO/OH)×100). Under mixing procedure A, PAPI 27 was mixed with Terate 203 in the stated proportions, and then ash was added to the PAPI/Terate mixture. Under mixing procedure B, ash was mixed with Terate 203 in the stated proportions, and then PAPI 27 was added to the ash/Terate mixture. Under mixing procedure C, one-half of the ash was mixed with Terate 203 and one-half of the ash was mixed with the PAPI 27, followed by mixing of the ash mixtures.

Figure 2:
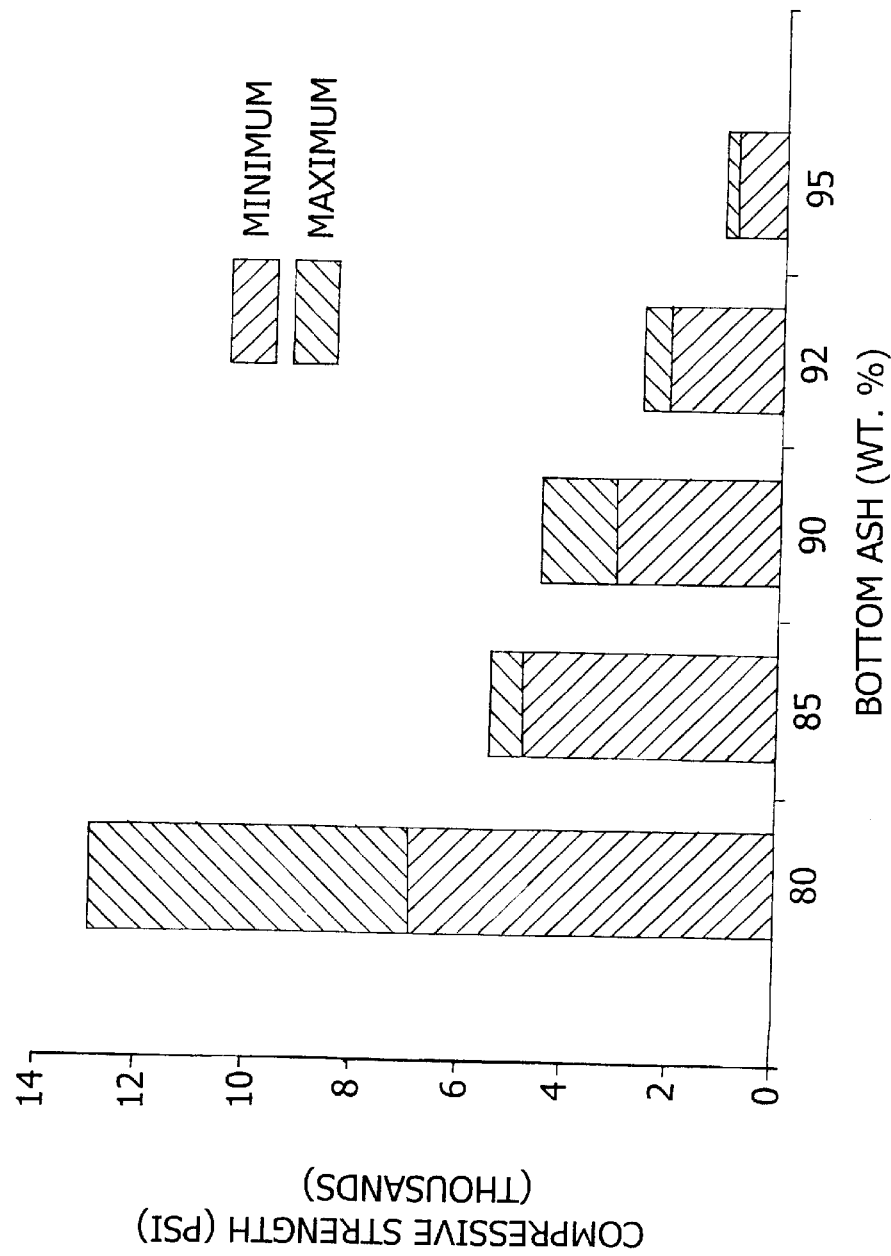

From these results, and especially FIGS. 1 and 2, it appears that the concentration (load) of the bottom ash and molding pressure had a much greater effect on the compressive strength of the solid than did any other variable. Regardless of the isocyanate index of the binder, mode of mixing, curing and postcuring temperature, Table 1 and FIG. 2 reveal that the compressive strength of solids molded at a pressure of approximately 1,500 psi decreased by increasing the bottom ash load from 80 to 95 wt. %.

The compressive strength of 80 wt. % bottom ash solids molded at approximately 1,500 psi, was in the range of 6,920 to 12,650 psi (Table 12). The two lowest values of the compressive strength (6,920 and 7,070 psi) were obtained for solids cured and postcured for the shortest period of time, indicating that curing and postcuring conditions have a significant effect on the composite properties. A similar effect of the postcuring time on the compressive strength was observed with 90 wt. % bottom ash solids prepared by mixing procedure C. Solids postcured for 24 hours had approximately 50% higher compressive strength than those prepared without postcuring (Table 1).

The mode of mixing did have an effect on the composite properties at higher bottom ash concentrations. Solids prepared at 90 wt. % of bottom ash and 1,500 psi molding pressure by mixing procedure C without postcuring exhibited almost the same compressive strength properties as solids prepared by mixing procedure A postcured for 60 minutes at 150° C. (Table 1). In the case of solids prepared at 3,000 and 6,000 psi molding pressures, the effect of mixing procedure was pronounced. Solids prepared by mixing procedure C exhibited significantly higher compressive strengths than those prepared by mixing procedure A (Table 2 and FIG. 1).

The molding pressure had a significant effect on the properties of bottom ash solids. Increasing the pressure from approximately 1,500 psi (Table 1) to 6,000 psi (Table 2) resulted in an increase in the compressive strength of the solids by two or more times (FIG. 1). Solids prepared at 90 wt. % bottom ash and a molding pressure of approximately 6,000 psi had a compressive strength similar to that of 80 wt. % bottom ash solids prepared at a molding pressure of approximately 1,500 psi.

EXAMPLE 3

Bottom Ash 1 was mixed with binder and molded into test blocks according to the procedure of Example 2, except that the binder was PAPI 27 alone. The compressive strengths of Bottom Ash 1 solids prepared in this manner at a molding pressure of approximately 6,000 psi are shown in Table 3. In two cases, wet ash was utilized for the preparation of the solids. In those cases, PAPI 27 was cured with moisture from the ash. The moisture content in Bottom Ash 1 was found to be about 10 wt. %. When dry ash was added to a mixture of PAPI 27 and water, the compressive strength of the solids was relatively high (Table 3), in some cases similar to those of 90 wt. % bottom ash solids prepared at the same molding pressure utilizing the PAPI 27/Terate 203 binder system (Table 2). Decreasing the amount of PAPI 27 in the solids from 10 to 5 parts by weight (pbw) resulted in a significant decrease in the compressive strength of the solids. A major advantage of the PAPI 27/water binder system over Terate 203/PAPI 27 is the longer pot life. A composite mixture with the Terate 203/PAPI 27 binder system can be mixed only for 3 to 4 minutes before molding. A composite mixture with the PAPI 27/water binder system can be mixed for at least 15 minutes. In addition, in the case of the PAPI 27/water binder system, the solidification procedure can be carried out on wet bottom ash, which is an additional advantage over the Terate 203/PAPI 27 binder system, which requires drying of the ash.

EXAMPLE 4

Solids were prepared according to the process of Example 2 at 90 and 100 pbw (parts by weight) of wet Bottom Ash 1 (Example 2) per 10 pbw of quasi-prepolymer. This quasi-prepolymer consisted of PAPI 27/Terate 203 at 5:1 and 10/1 PAPI 27/Terate 203 equivalent weight ratios. The equivalent weight of PAPI 27 is 133.8 and the equivalent weight of Terate 203 is 178. A 5:1 equivalent weight ratio is therefore achieved by mixing 669 (133.8×5=669) pbw PAPI 27 with 178 pbw Terate 203. Solids were cured for 1 hour at 150° C. and postcured for 24 hours at 100° C. The molding pressure had a significant effect on the compressive strength of the solids (Table 4 and FIG. 3). The compressive strength of solids prepared at 90 pbw of the bottom ash and molding pressure of 3,000 psi was about 6,000 psi and that prepared at 100 pbw at the same molding pressure was between 5,300 and 5,500 psi. The compressive strength of the solids prepared at molding pressure of 6,000 psi was in the range of 7000 to 8,200 psi. Neither the concentration of the bottom ash nor the equivalent ratio of PAPI 27/Terate 203 in the quasi-prepolymer had a significant effect on the composite properties (Table 4).

Figure 3:
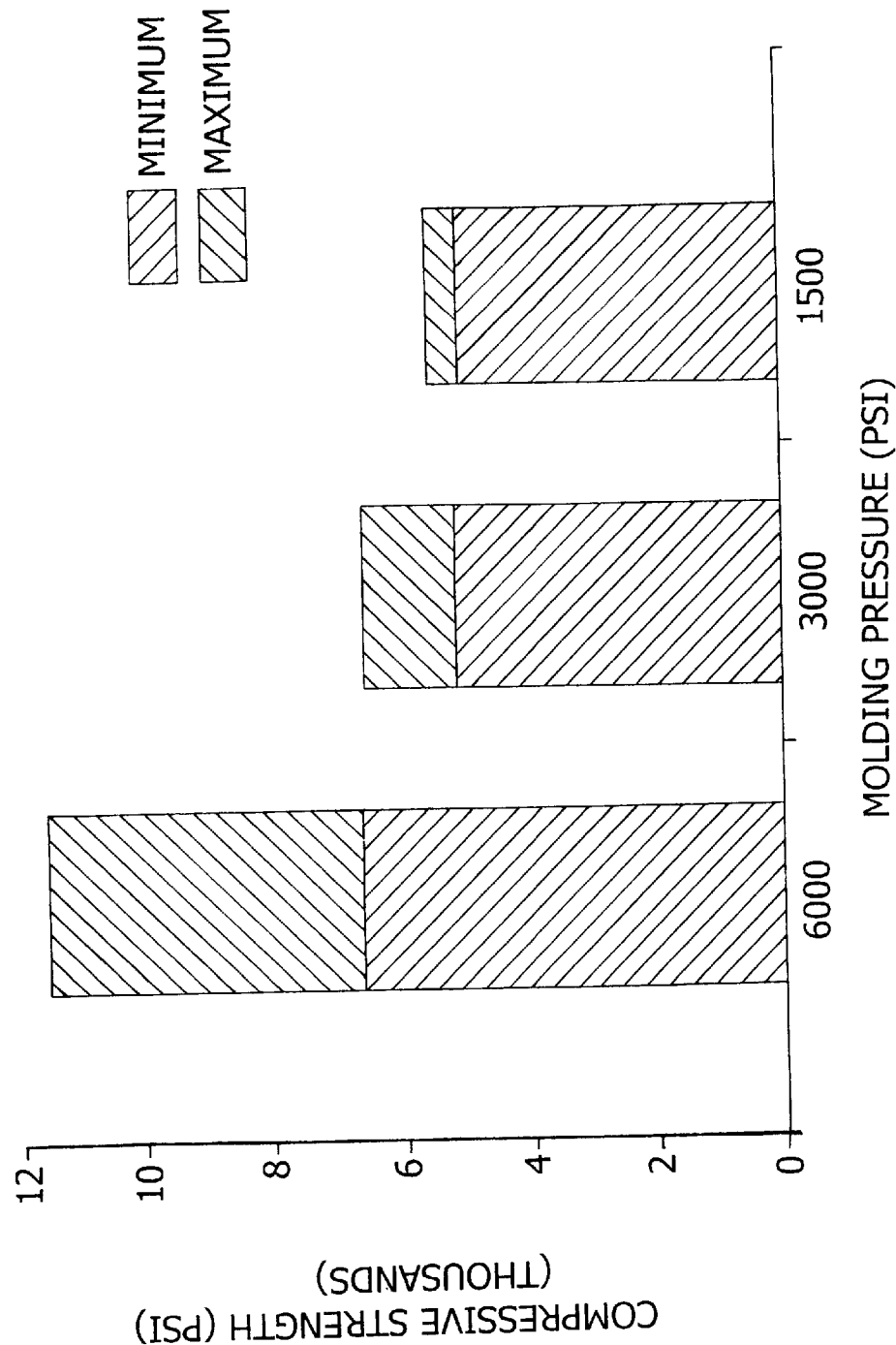

The effect of the molding pressure on the composite properties is also evident in the case of the solids prepared from 100 pbw of wet bottom ash and 10 pbw of quasi-prepolymer at a 5:1 PAPI 27/Terate 203 equivalent ratio, postcured using microwave energy (Table 5 and FIG. 3). The compressive strength increased from 4,500 to 8,000 psi with an increase in the molding pressure from 1,500 to 6,000 psi. However, the compressive strength of the solids prepared at 1,500 psi is still somewhat better than that of Portland cement Type II. According to ASTM C-150, the accepted value for the compressive strength of Portland cement Type II is 4000 psi.

As can be seen in Table 5, the compressive strength of the solids did not significantly depend on the postcuring conditions. The compressive strength of solids prepared without postcuring was practically the same as those postcured for 15 minutes in the microwave oven, and only somewhat lower than those postcured for 24 hours at 100° C. The solids which were not postcured in the microwave or conventional thermal oven were aged for 28 days at room conditions before testing.

EXAMPLE 5

Solids were prepared according to the process of Example 2 at 90 and 100 pbw of wet Bottom Ash 1 (Example 2) per 10 pbw of quasi-prepolymer. The effects of curing and postcuring conditions were studied on the solids prepared from dry Bottom Ash 1 and Bottom Ash 2 and 10 pbw of NCO quasiprepolymer at a 10:1 PAPI 27/Terate 203 equivalent weight ratio. Water was added to the quasi-prepolymer prior to mixing with the bottom ash. As shown in Table 6, solids prepared from Bottom Ash 1 had satisfactory properties after curing for 15 min. at 150° C. Postcuring had some effect. In the case of solids prepared at 6,000 psi molding pressure, the lowest value for the compressive strength was obtained for the solids which were aged for 28 days at room conditions without postcuring (Table 6). However, the same effect was not observed for the solids prepared at 3,000 psi molding pressure. The compressive strength of solids based on Bottom Ash 1 postcured for 24 hours at 100° C. did not differ that much from the solids postcured in microwave oven for 15 minutes (Table 6).

In order to further examine postcuring conditions, a number of solids were prepared from Bottom Ash 2 with varying postcuring conditions. Solids prepared at the same curing conditions were postcured for 24 hours at 100° C. or for 15 minutes at 1.2 KW microwave energy. The compressive strength of the solids was similar regardless whether they were postcured in a conventional or microwave oven (Table 7). Confirming that microwave curing was efficient was the fact that the weight loss of the composites due to water evaporation in the microwave oven after postcuring for 5 minutes at 1.2 KW microwave energy was similar to that after postcuring for 24 hours at 100° C. in the conventional thermal oven (Table 8). Water was utilized in a large excess in the composite formulations to improve wetting of the solid particulates. A small portion of water reacts with isocyanate, and most of it evaporates during curing for 15 minutes at 150° C. Solids were cured for 15 minutes at 150° C. and 6,000 psi molding pressure.

EXAMPLE 6

Coal Ash 1 and Fly Ash 1 solids were prepared utilizing the PAPI 27/Terate 203 binder system at a molding pressure of 6,000 psi (Table 9) and the procedure of Example 2. The compressive strengths of both types of solids were much lower than those of Bottom Ash 1 solids prepared at the same ash loads utilizing the same type of binder system (Table 2). This can be explained by the much larger density of Bottom Ash 1. The density of Bottom Ash 1 was over two times that of Fly Ash 1 and over 1.6 times that of Coal Ash 1.

Solids were also prepared utilizing a mixture of Fly Ash 2 and Bottom Ash 2 (Table 10). Solids based on Bottom Ash 2 were prepared as a reference. In order to obtain good wetting and compacting of the composite systems prepared with a mixture of fly ash and bottom ash, over three times more of water was utilized compared to solids based only on the bottom ash. The best properties were obtained for the solids with the maximum amount of water which did not leach during compression molding and curing of the composite. As expected, by replacement of 50% of the bottom ash with fly ash in solids with total 90 pbw of ash and 10 pbw of quasi-prepolymer, compressive strength decreased from about 10,000 to 7,000 psi (Table 10). Solids with 67.5 pbw of fly ash and 22.5 pbw of bottom ash and 10 pbw of quasi-prepolymer exhibited compressive strengths of 4,000–4,800 psi.

EXAMPLE 7

Flexural strength tests were conducted according to ASTM D790-84. The largest flexural strength and flexural modulus were obtained for 80 wt. % Bottom Ash 1 solids (Table 11). However, it should be noted that the dimensions of the samples did not meet the requirements specified in ASTM 790-84.

EXAMPLE 8

Modified freezing and thawing testing was carried out on Bottom Ash 2 solids and concrete samples. A cycle of freezing for several hours at temperatures lower than −40° followed by immersion in water at room temperature was repeated for three weeks. The compressive strength of the bottom ash solids and concretes did not change after three weeks, which is an indication that much longer freezing and thawing time is needed for degradation to take place. However, it should be noted that 90 wt. % bottom ash solids exhibited several times larger compressive strengths and one magnitude larger compression modulus than concrete (Table 12).

EXAMPLE 9

Pigmented solids were prepared with concentrations of Bottom Ash 2 from 90 to 97 wt. %. R-110 Red Iron Oxide Pigment was utilized (0.3 pbw per 100 pbw of the bottom ash) as a pigment. Two types of samples with 2×x2×2 inch dimensions and 6×3.5×2 inch dimensions were prepared. Smaller samples were prepared at a molding pressure of 6,000 psi and larger ones at 1.600 psi. The compressive strengths of solids prepared with 97 wt. % bottom ash and only 3 wt. % quasi-prepolymer binder system at 6,000 psi molding pressure were larger than those of concrete samples (Tables 12 and 13).

As demonstrated by -the foregoing examples, this invention consistently produces solids having compressive strengths of greater than 1000 psi, 3000 psi, 5000, psi, and even 7000 psi.

In view of the above, it will be seen that the several objects of the invention are achieved and other advantageous results attained.

As various changes could be made in the above construction and methods without departing from the scope of the invention, it is intended that all matter contained in the above description or shown in the accompanying drawings shall be interpreted as illustrative and not in a limiting sense.

What is claimed is:

1. A compressed solid produced from a feed mixture comprising a binder and from about 50% to about 95% by weight bottom ash resulting from burning wood, said bottom ash having a density of greater than about 60 lbs/ft$^3$, and from about 5% to about 20% binder, wherein the solid has a compressive strength of at least about 1000 psi and a flexural strength of at least about 500 psi.

2. The compressed solid of claim 1 wherein the feed mixture comprises from about 80% to about 95% by weight bottom ash.

3. The compressed solid of claim 2 having a compressive strength of at least about 3000 psi.

4. The compressed solid of claim 3 having a compressive strength of at least about 5000 psi.

5. The compressed solid of claim 1 wherein the bottom ash has a density of greater than about 60 lbs/ft$^3$ and is bottom ash resulting from the burning of waste wood products selected from the group consisting of waste wood railroad ties, waste wood utility poles, and mixtures thereof.

6. The compressed solid of claim 1 wherein the bottom ash contains between about 5% and about 15% by weight water.

7. The compressed solid of claim 1 wherein the binder comprises an isocyanate-based binder.

8. The compressed solid of claim 7 wherein the binder comprises an isocyanate-based binder in mixture with a polyol.

9. The compressed solid of claim 7 wherein the binder comprises polymethylene polyphenyl isocyanate containing 4,4'methylene bisphenyl isocyanate.

10. The compressed solid of claim 9 wherein the binder comprises polymethylene polyphenyl isocyanate containing 4,4'methylene bisphenyl isocyanate in combination with a terephthalate-based polyester polyol.

11. The compressed solid of claim 8 wherein the binder comprises an isocyanate-based binder in mixture with a polyol in an equivalent weight ratio of between about 4:1 and about 11:1 isocyanate-based binder/polyol.

12. The compressed solid of claim 11 wherein the binder is polymethylene polyphenyl isocyanate containing 4,4'methylene bisphenyl isocyanate in combination with a terephthalate-based polyester polyol in an equivalent weight ratio of about 4:1 to about 11:1.

13. The compressed solid of claim 1 wherein the feed mixture comprises from about 50% to about 90% by weight bottom ash and from about 5% to about 40% by weight material selected from the group consisting of fly ash, shredded carpet fibers, shredded mylar, broken glass, and cotton.

14. A compressed solid for use as a building block, landscaping block or walkway stone produced by pressing and drying a feed mixture comprising from about 80% to about 95% by weight bottom ash having a density of greater than about 60 lbs/ft$^3$ resulting from burning wood and from about 5% to about 20% binder;

wherein the compressed solid has a compressive strength in the range of from about 1000 psi to about 10,000 psi and a flexural strength of at least about 500 psi;

wherein the bottom ash contains about 5–15% by weight water; and wherein the binder is selected from the group consisting of an isocyanate-based binder and an isocyanate-based binder in mixture with a polyol.

15. A compressed solid for use as a building block, landscaping block or walkway stone produced by pressing and drying a feed mixture comprising at least about 50% by weight of a first filler material consisting of wood burning bottom ash having a density of greater than about 60 lbs/ft$^3$ and from about 5% to about 45% by weight of a second filler material;

wherein the compressed solid has a compressive strength in the range of about from about 1000 psi to about 10,000 psi and a flexural strength of at least about 500 psi;

wherein the bottom ash contains from about 5% to about 15% water; and wherein the binder is selected from the group consisting of an isocyanate-based binder and an isocyanate-based binder in mixture with a polyol.

16. The solid of claim 15 wherein the second filler material is selected from the group consisting of fly ash, shredded carpet fibers, shredded mylar, broken glass, and cotton.

17. A process for producing a compressed solid from filler material comprising bottom ash, the process comprising:

mixing filler material comprising at least about 50% bottom ash resulting from burning wood said bottom ash having a density of greater than about 60 lbs/ft$^3$, with a binder to form a feed mixture material of bottom ash and binder in intimate admixture; and pressing the feed mixture material into a solid shape suitable for use as a building block, landscaping block, or walkway stone wherein the solid has a compressive strength of at least about 1000 psi and a flexural strength of at least about 500 psi.

18. The process of claim 17 wherein said filler material comprises from about 80% to about 95% by weight bottom ash resulting from burning wood;

wherein the binder is selected from the group consisting of an isocyanate-based binder and an isocyanate-based binder in mixture with a polyol; and wherein said pressing is accomplished at a pressure in the range of from about 1000 psi to about 6000 psi.

* * * * *